May 5, 1964     A. G. SCHILBERG     3,131,576
CONSTRUCTION FOR LINKS AND STRUTS
Filed Dec. 15, 1961
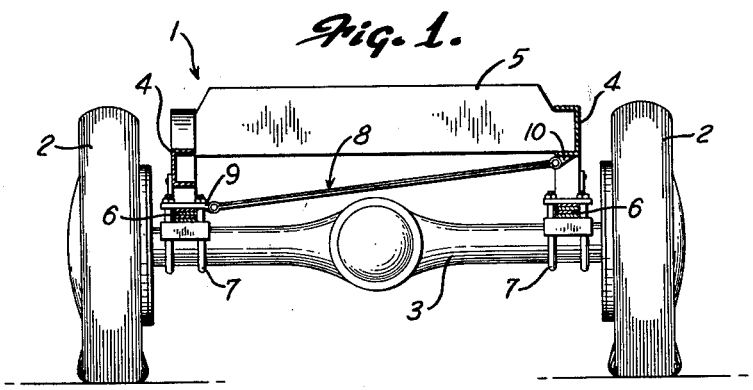
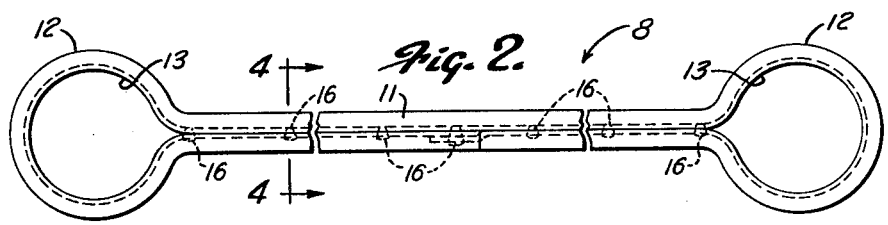
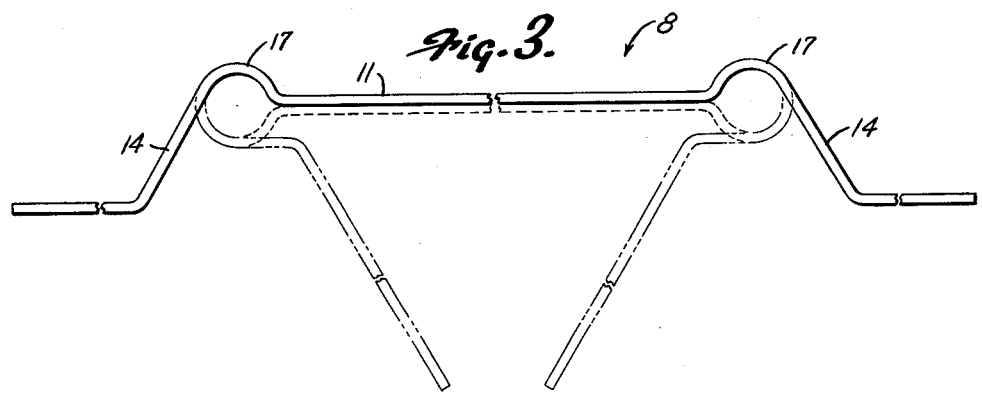
INVENTOR.
ARNOLD G. SCHILBERG
DECEASED, BY IRENE G. SCHILBERG
ADMINISTRATRIX
BY Andrus & Starke
ATTORNEYS

United States Patent Office 3,131,576
Patented May 5, 1964

3,131,576
CONSTRUCTION FOR LINKS AND STRUTS
Arnold G. Schilberg, deceased, late of Milwaukee, Wis., by Irene G. Schilberg, special administratrix, Milwaukee, Wis., assignor to A. O. Smith Corporation, Milwaukee, Wis., a corporation of New York
Filed Dec. 15, 1961, Ser. No. 170,529
3 Claims. (Cl. 74—588)

This invention relates generally to links or struts of the type used for connecting structural members together and particularly relates to links or struts of improved, lightweight construction.

The links or struts with which the present invention is concerned might be used, for example, in motor vehicles to stabilize sprung and unsprung vehicle assemblies relatively to one another. Specifically, such links have been mounted laterally of the vehicle and between the rear wheel axle and either the body or frame to reduce the allowable lateral movement of the axle to the body or frame as the case may be. This type of stabilization is essential in some vehicle designs to prevent the axle from moving out against the frame and to prevent excessive lateral movement of the wheel.

Up to now, the most economical construction for these links or struts has consisted of a pressed sheet metal body portion of either tubular or box shaped sectional area and special forged end fittings welded into the ends for attaching the struts in place. The present invention proposes an even more economical construction for these links and which is lighter and equally as rigid as previous designs.

According to the invention, the link is fabricated of a continuous pressed metal beam of open channel section. This beam is bent back upon itself lengthwise to form the strut with the web of the doubled over half disposed in back-to-back, abutting relation with the web of the other half of the beam and secured rigidly thereto by welding.

During the bending operation, the portions of the beam forming the ends of the strut are curled on curved outwardly, back and around together in a circular fashion to form integral, tubular attachment members on either end of the strut. The curling or curving of the beam is preferably effected by using mandrels or circular dies as a form against which the beam is pressed in the bending step.

The strut formed according to the invention thus eliminates the need for separate end pieces or fittings required in former designs in addition to a welding operation for attaching the pieces to the strut, thus decreasing the overall cost and weight of the strut. The strut presently proposed is extremely rigid and strong as the particular cross-sectional configuration thereof places a high proportion of the available material outwardly from the neutral axis of the strut so that it can efficiently resist twisting loads imposed thereon. The double thickness of the web gives the strut a columnar strength equal to designs of heavier construction, thus providing a strut of high overall rigidity and strength despite its lightweight construction.

The accompanying drawing illustrates the best mode presently contemplated of carrying out the invention.

In the drawing:

FIG. 1 is a cross sectional view of the rear portion of a motor vehicle chassis showing the general location of the strut of the invention, FIG. 2 is a plan view of the strut of the invention, FIG. 3 is a plan view of a channel beam which forms the strut of the invention with the phantom lines indicating successive positions of the beam during forming of the strut; and FIG. 4 is a cross sectional view of the main portion of the strut taken along the lines 4—4 of FIG. 2.

Although the strut or link of the present invention may be used in practically all cases requiring two members to be connected, in the specific embodiment shown, it is used in a motor vehicle to stabilize unsprung and sprung vehicle assemblies relatively of one another. With this in mind, and referring to the drawing, a portion only of a vehicle chassis 1 is shown as having an unsprung assembly consisting of a pair of ground wheels 2 supported on either end of an axle 3 and a sprung assembly consisting of a pair of frame side rails 4 connected in transversely spaced relation by a suitable cross member 5. The sprung and unsprung assemblies are connected through a pair of the leaf springs 6. The upper ends of springs 6 are connected longitudinally of each of side rails 4 by any suitable known means while their lower portions are fastened to the axle 3 inwardly of wheels 2 by the U-bolts 7.

In the described structure, there are times when the sprung or frame assembly is caused to be shifted laterally relatively of the unsprung wheel and axle assembly such as during cornering of the vehicle. In order to minimize this movement, vehicle chassis 1 incorporates a stabilizing strut 8 which in actual practice is connected for pivoting movement at one end to a suitable bracket 9 on one of the U-bolt assemblies 7 while the opposite end is similarly pivotally connected to the opposite frame rail 4 by a bracket or hanger 10. The strut construction must be such that it not only effectively withstands the relatively high stresses in tension, compression, and torque, but must also be fairly lightweight and inexpensive of manufacture. The strut 8 forming the subject matter of this invention is designed to provide these characteristics as will now be described.

The improved strut of the invention has an integral sheet metal construction including an elongated I-section body portion 11 and a pair of enlarged, rounded end portions 12 having the transverse assembly openings 13 provided therein. In forming strut 8, a continuous channel section beam member 14 of the required length and gauge is bent double on itself lengthwise with the webs 15 of the two halves disposed in back-to-back relation. The ends of beam 14 meet generally at the mid-point of the strut and are secured in overlapping relation by a suitable plug weld 16 burned between the opposed webs 15. Similar welds 16 are laid between the webs 15 of the two beam sections at suitable intervals along the length of body portion 11, as shown, to provide a strong, rigid construction.

The rounded, open end portions 12 are formed during the bending operation by pressing beam 14 outwardly a predetermined distance from either end to provide an arch or bowed portion 17 and then successively curving or curling these portions back and around together in the manner of a loop as the ends of beam 14 are bent together. Openings 13 in end portions 12 may be maintained perfectly round through the use of suitable mandrels or circular dies (not shown) placed against beam 14 in each of the portions 17 with suitable complementary dies (not shown) being applied against the outer side of the beam. In actual practice, a burn through plug weld 16 is placed between opposed web portions 15 closely adjacent the ends of body portion 11 to prevent openings 13 from enlarging or becoming distorted during use of strut 8. End portions 12 have a relatively high section modulus owing to the channel form of beam 14 and, as a consequence, the strut as a whole may be made of fairly light gauge material and still be sufficiently rigid in its end portions to withstand the required loads.

In the present construction then, the bearings or end fittings for attaching the strut are formed integrally with the strut with relatively little exepnse. This construction is highly advantageous from a cost standpoint in situations where the strut is required to be pivotally attached at one or both ends such as in the specific application shown here and where heretofore it was necessary to weld special forged pieces to the ends of the strut. The present strut, by reason of its double channel thickness body portion, has a high columnar strength and an overall rigidity comparable to struts of heavier construction.

Various modes of carrying out the invention are contemplated as being within the scope of the following claims particularly pointing out and distinctly claiming the subject matter which is regarded as the invention.

What is claimed is:

1. A strut comprising a continuous sheet metal beam bent about an axis which is transverse to the longitudinal axis of the beam to provide back-to-back opposed portions in abutting relation and having enlarged end portions spaced from one another to provide transverse assembly openings, said back-to-back portions of said beam being secured rigidly together adjacent the ends thereof and between the end portions thereof.

2. An integral sheet metal strut comprising a continuous channel section beam bent upon itself to provide back-to-back opposed portions with the web of said portions in abutting relation and secured rigidly together adjacent the ends and with the webs of the opposed portions of the beam at predetermined distances from the ends being spaced from one another to form assembly openings in either end of the completed strut.

3. An integral sheet metal connector strut comprising a continuous channel section beam member bent about an axis which is transverse to the longitudinal axis of the beam with the webs of the opposed beam sections being disposed in back-to-back abutting relation and being secured rigidly together adjacent the ends thereof and with the opposed webs of the beam in the plane of the beam and a predetermined distance from either end thereof being spaced apart to form continuous rounded and enlarged ends on either end of the beam for attaching the strut between a pair of members.

References Cited in the file of this patent

UNITED STATES PATENTS

| | | |
|---|---|---|
| 2,057,897 | Jencick | Oct. 20, 1936 |
| 2,120,016 | Bugatti | June 7, 1938 |
| 2,159,859 | Nickelsen | May 23, 1939 |